United States Patent
Li et al.

(10) Patent No.: US 12,368,815 B2
(45) Date of Patent: Jul. 22, 2025

(54) VIDEO SHOOTING METHOD AND APPARATUS, ELECTRONIC DEVICE AND STORAGE MEDIUM

(71) Applicant: BEIJING ZITIAO NETWORK TECHNOLOGY CO., LTD., Beijing (CN)

(72) Inventors: Cheng Li, Beijing (CN); Chenman Zhou, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/390,809

(22) Filed: Dec. 20, 2023

(65) Prior Publication Data
US 2024/0121349 A1    Apr. 11, 2024

Related U.S. Application Data

(63) Continuation of application No. 17/406,808, filed on Aug. 19, 2021, now Pat. No. 11,895,424.

(30) Foreign Application Priority Data

May 20, 2021    (CN) .......................... 202110554245.9

(51) Int. Cl.
    H04N 5/262      (2006.01)
    H04N 23/63      (2023.01)
(52) U.S. Cl.
    CPC ......... *H04N 5/2621* (2013.01); *H04N 23/632* (2023.01)

(58) Field of Classification Search
    CPC ..... H04N 5/2621; H04N 23/632; H04N 5/265
    See application file for complete search history.

(56) References Cited

U.S. PATENT DOCUMENTS

| 2008/0030621 A1 | 2/2008 | Ciudad et al. |
| 2014/0320591 A1 | 10/2014 | Baron, Jr. et al. |

(Continued)

FOREIGN PATENT DOCUMENTS

| CN | 1700797 A | 11/2005 |
| CN | 103747192 A | 4/2014 |

(Continued)

OTHER PUBLICATIONS

International Search Report and Written Opinion received for PCT Patent Application No. PCT/CN2022/091829, mailed on Jul. 29, 2022, 14 pages.

(Continued)

*Primary Examiner* — Yogesh K Aggarwal

(57) ABSTRACT

The embodiments of the present disclosure provide video shooting method and apparatus, electronic device and storage medium. The method comprises: receiving a first trigger operation for target content displayed in a target page, the target page comprising a webpage material display page and/or a video playing page; in response to the first trigger operation, acquiring a target picture containing the target content, starting a camera, and displaying a shooting page, wherein a preview picture of a target object acquired by the camera is displayed in the shooting page with the target picture as a background; receiving a video shooting operation acting in the shooting page; and in response to the video shooting operation, shooting a first video of the target object with the target picture as a video background.

18 Claims, 8 Drawing Sheets

(56) References Cited

U.S. PATENT DOCUMENTS

| | | |
|---|---|---|
| 2014/0359410 A1 | 12/2014 | Lee |
| 2016/0073040 A1 | 3/2016 | Jen et al. |
| 2018/0322215 A1* | 11/2018 | Lu .................... H04L 67/02 |
| 2020/0051527 A1* | 2/2020 | Ngo .................... H04N 5/57 |
| 2020/0204458 A1 | 6/2020 | Masuda et al. |
| 2021/0195284 A1 | 6/2021 | Song |
| 2021/0321046 A1 | 10/2021 | Zhao et al. |
| 2022/0301180 A1 | 9/2022 | Wang et al. |
| 2022/0377259 A1 | 11/2022 | Li |

FOREIGN PATENT DOCUMENTS

| | | |
|---|---|---|
| CN | 106254784 A | 12/2016 |
| CN | 109089059 A | 12/2018 |
| CN | 110290425 A | 9/2019 |
| CN | 110457624 A | 11/2019 |
| CN | 110602394 A | 12/2019 |
| CN | 110675420 A | 1/2020 |
| CN | 111464761 A | 7/2020 |
| CN | 111629151 A | 9/2020 |
| CN | 306182373 S | 11/2020 |
| CN | 112468868 A | 3/2021 |
| EP | 3783491 A1 | 2/2021 |
| JP | 2016-066998 A | 4/2016 |
| JP | 2017038344 A | 2/2017 |
| KR | 10-2015-0065045 A | 6/2015 |
| WO | 2020/010814 A1 | 1/2020 |

OTHER PUBLICATIONS

Non-Final Office Action mailed on Apr. 13, 2022, for U.S. Appl. No. 17/406,808, pp. 8.
Non-Final Office Action mailed on Mar. 29, 2023, for U.S. Appl. No. 17/406,808, pp. 7.
Notice of Allowance mailed on Nov. 2, 2022, for U.S. Appl. No. 17/406,808, pp. 12.
Notice of Allowance mailed on Sep. 2, 2022, for U.S. Appl. No. 17/406,808, pp. 6.
Notice of Allowance mailed on Sep. 20, 2023, for U.S. Appl. No. 17/406,808, pp. 6.
Notification to Grant received from Chinese patent application No. 202110554245 mailed on Jan. 31, 2024, 3 pages (2 pages English Translation and 1 page Original Copy).
Office action received from Chinese patent application No. 202110554245.9 mailed on Sep. 26, 2023, 15 pages (6 pages English Translation and 9 pages Original Copy).
Communication pursuant to Rules 70(2) and 70a(2) EPC for European Application No. 22803819.6, mailed Oct. 9, 2024, 1 page.
European Search Report for EP Patent Application No. 22803819.6, Issued on Sep. 18, 2024, 7 pages.
Notice of Reasons of Rejection issued in JP Appl. No. 2023-571848 on Jan. 27, 2025 (7 pages).

* cited by examiner

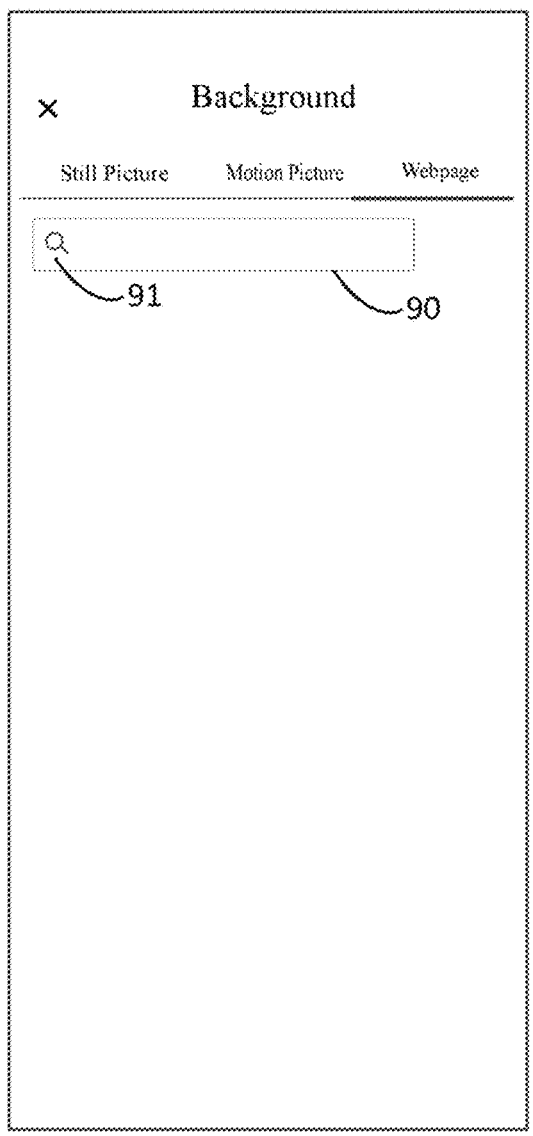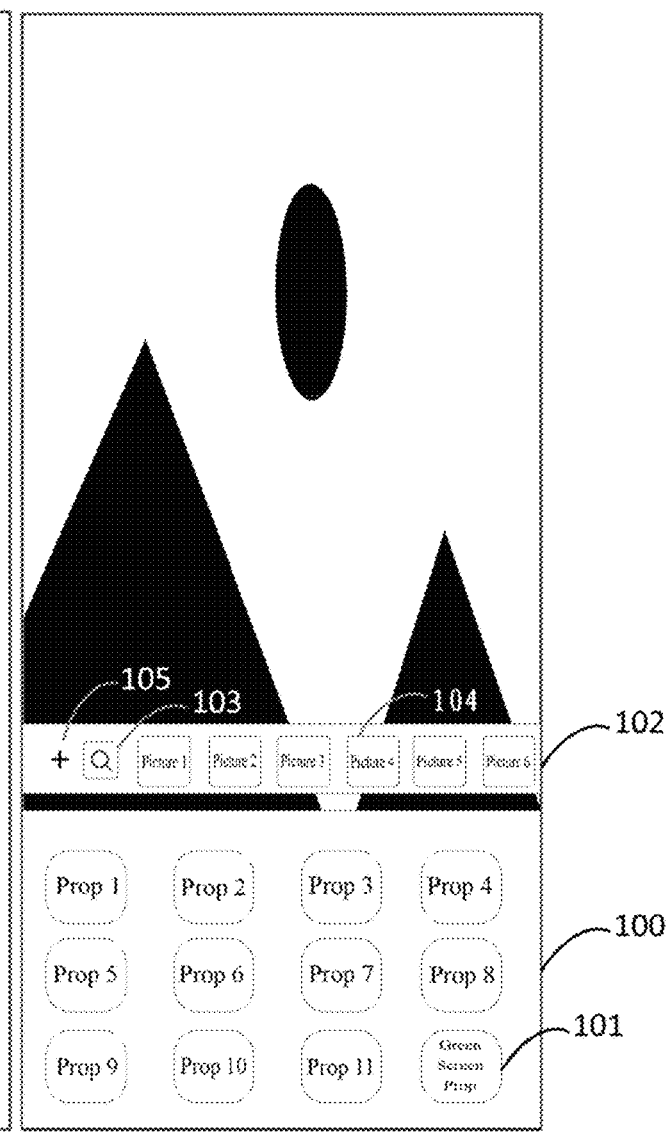
FIG. 9                                   FIG. 10

VIDEO SHOOTING METHOD AND APPARATUS, ELECTRONIC DEVICE AND STORAGE MEDIUM

CROSS-REFERENCE TO RELATED APPLICATIONS

The present disclosure is based on and claims priority to China Patent Application No. 202110554245.9 filed on May 20, 2021, the disclosure of which is incorporated by reference herein in its entirety.

TECHNICAL FIELD

The embodiment of the present disclosure relates to the field of image processing technology, and in particular, to video shooting method and apparatus, electronic device, and storage medium.

BACKGROUND

A user can browse image-text information via a webpage or application software (e.g., a browser, etc.). However, when a user browses image-text information, if the user desires to perform video creation using the browsed image-text information, a better solution does not exist at present, resulting in poor user experience.

SUMMARY

The embodiment of the present disclosure provides video shooting method and apparatus, electronic device and storage medium for shooting a video containing specific image-text content.

In a first aspect, an embodiment of the present disclosure provides a video shooting method, comprising:
  receiving a first trigger operation for target content displayed in a target page, the target page comprising a webpage material display page and/or a video playing page;
  in response to the first trigger operation, acquiring a target picture containing the target content, starting a camera, and displaying a shooting page, wherein a preview picture of a target object acquired by the camera is displayed in the shooting page with the target picture as a background;
  receiving a video shooting operation acting in the shooting page; and
  in response to the video shooting operation, shooting a first video of the target object with the target picture as a video background.

In a second aspect, an embodiment of the present disclosure further provides a video shooting apparatus, comprising:
  a first receiving module configured to receive a first trigger operation for target content displayed in a target page, the target page comprising a webpage material display page and/or a video playing page;
  a picture acquiring module configured to acquire, in response to the first trigger operation, a target picture containing the target content, start a camera and display a shooting page, wherein a preview picture of a target object acquired by the camera is displayed in the shooting page with the target picture as a background;
  a shooting receiving module configured to receive a video shooting operation acting in the shooting page; and
  a video shooting module configured to shoot, in response to the video shooting operation, a first video of the target object with the target picture as a video background.

In a third aspect, an embodiment of the present disclosure further provides an electronic device, comprising:
  one or more processors; and
  a memory for storing one or more programs,
  wherein the one or more programs, when executed by the one or more processors, cause the one or more processors to perform the video shooting method according to the embodiment of the present disclosure.

In a fourth aspect, the embodiment of the present disclosure further provides a non-transitory computer-readable storage medium, on which a computer program is stored, which, when being executed by a processor, performs the video shooting method according to the embodiment of the present disclosure.

The video shooting method, apparatus, electronic device and the storage medium provided by the embodiments of the present disclosure receive a first trigger operation acting in a target page displaying target content, the target page comprising a webpage material display page and/or a video playing page; in response to the first trigger operation, acquire a target picture containing the target content, start a camera, switch a current display page from the target page to a shooting page, and display a preview picture of a target object acquired by the camera in the shooting page with the target picture as a background; receive a video shooting operation acting in the shooting page; in response to the video shooting operation, shoot a first video of the target object with the target picture as a video background. By adopting the above technical solution in the embodiments of the present disclosure, video can be shot by utilizing target content browsed by a user, and the user experience is improved.

BRIEF DESCRIPTION OF THE DRAWINGS

The above and other features, advantages, and aspects of embodiments of the present disclosure will become more apparent with reference to the following detailed description in conjunction with the drawings. Throughout the drawings, the same or similar reference signs refer to the same or similar elements. It should be understood that the drawings are schematic and that elements and components are not necessarily drawn to scale.

FIG. 9 is a schematic diagram of a background material page provided by an embodiment of the present disclosure.

FIG. 10 is a schematic diagram of a prop window provided by an embodiment of the present disclosure.

DETAILED DESCRIPTION

Figure 1:
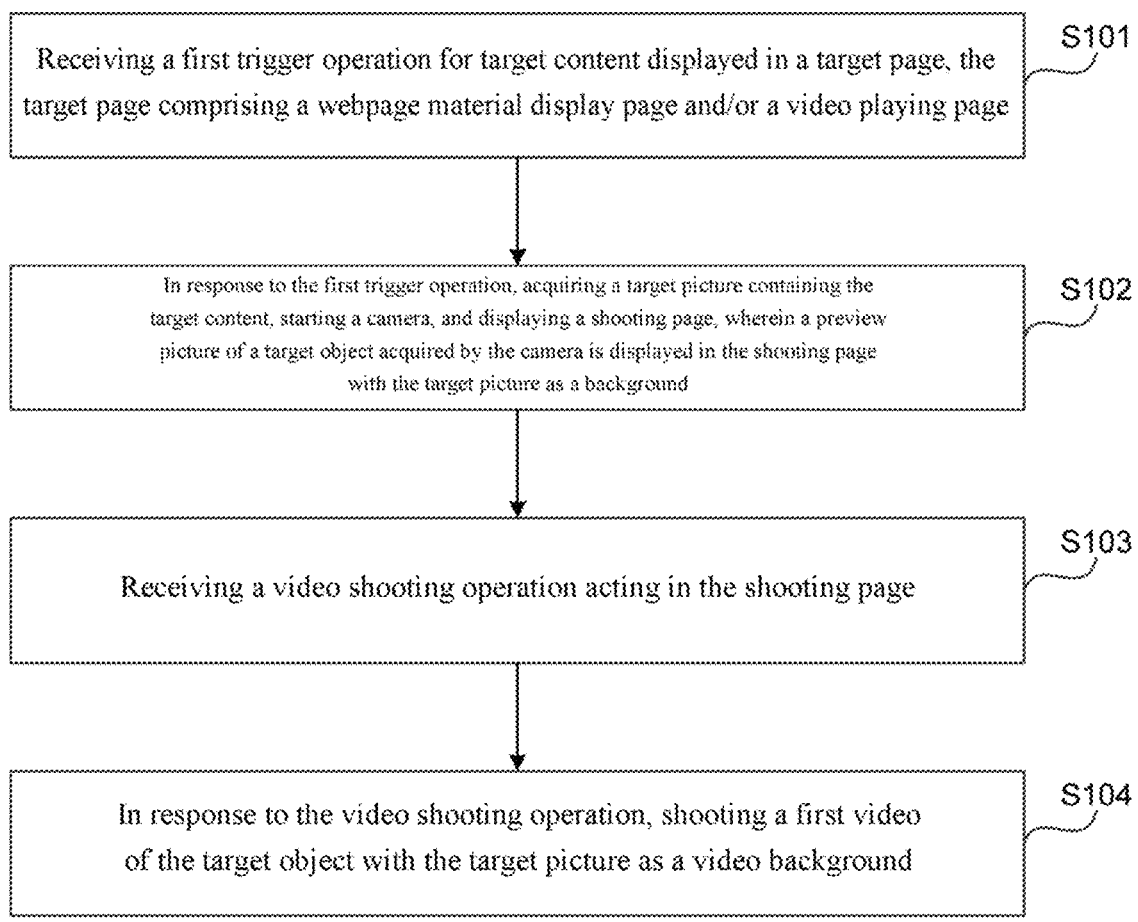
FIG. 1 is a schematic flowchart of a video shooting method provided by an embodiment of the present disclosure.

Embodiments of the present disclosure will be described in more details below with reference to the drawings. While certain embodiments of the present disclosure are shown in the drawings, it should be understood that the present disclosure may be embodied in various forms and should not be construed as limited to the embodiments set forth herein, but rather, the embodiments are provided for a more complete and thorough understanding of the present disclosure. It should be understood that the drawings and the embodiments of the present disclosure are for illustration purposes only and are not intended to limit the scope of the disclosure.

It should be understood that the respective steps recited in method embodiments of the present disclosure may be performed in a different order, and/or performed in parallel. Moreover, the method embodiments may include additional steps and/or omit performing of the illustrated steps. The scope of the present disclosure is not limited in this respect.

The term "including" and variations thereof as used herein is intended to be open-ended, i.e., "including but being not limited to". The term "based on" means "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the concepts "first", "second", and the like in the present disclosure are only used for distinguishing different devices, modules or units, and are not used for limiting the order or interdependence of the functions performed by the devices, modules or units.

It should be noted that references to "a" or "an" in this disclosure are intended to be illustrative rather than limiting. Those skilled in the art should appreciate that said references should be understood as "one or more", unless being clearly indicated otherwise in the context.

Names of messages or information exchanged between devices in the embodiments of the present disclosure are for illustrative purposes only, and are not intended to limit the scope of the messages or information.

FIG. 1 is a schematic flowchart of a video shooting method provided by an embodiment of the present disclosure. The method may be performed by a video shooting apparatus, wherein the apparatus may be implemented by software and/or hardware and configured in an electronic device, and may be typically configured in a mobile phone or a tablet computer. The video shooting method provided by the embodiment of the present disclosure is suitable for a scenario of shooting a video with a specific background and is particularly suitable for a scenario of shooting a video with content browsed by a user as a background. As shown in FIG. 1, the video shooting method provided in this embodiment may comprise:

S101, receiving a first trigger operation for target content displayed in a target page, the target page comprising a webpage material display page and/or a video playing page. The target page may be a certain page in a video shooting software, such as a video playing page and/or a webpage material display page. The webpage material display page may be a page for displaying a webpage material, and the webpage material may be understood as a page-like background material, such as image-text content displayed in the page. Accordingly, the target content may be understood as content displayed in the target page, which is intended to be used as a background for shooting a video, such as content included in a video played in the video playing page, a webpage material displayed in the webpage material display page, or the like. The first trigger operation may instruct an operation that causes an electronic device to use a picture containing the target content as a shooting background, such as an operation of triggering prompt information or a shooting control in the video playing page, an operation of triggering a background-creating control in the webpage material display page, or the like.

Specifically, the electronic device may display the target content in the target page. Therefore, when a user desires to shoot a video with the target content as the background, the first trigger operation can be performed. Accordingly, the electronic device may receive a first trigger operation performed by the user.

In one embodiment, the target page includes the video playing page, the first trigger operation includes a trigger operation for shooting prompt information on the target picture, and the method further comprises: playing, in the target page, a second video with the target picture as a video background; receiving a fifth trigger operation for the second video; and in response to the fifth trigger operation, displaying the shooting prompt information to prompt a user to adopt the target picture to shoot a video.

In the above embodiment, the target page may be the video playing page, and the electronic device may display the target content in the video playing page in a video background manner, so that the user may view the video in the video playing page, and shoot a new video with a background of the viewed video as a shooting background by performing the first trigger operation.

The second video may be a video acquired by taking a certain picture as a video background. The target picture may be the background picture in the second video, which may be the background picture containing certain content (e.g., image-text content displayed in a certain page), and the image-text content may be an article, news, or the like.

The fifth trigger operation may be a trigger operation that instructs the electronic device to display the shooting prompt information, such as a click operation that is performed in a video playing region (that is, a region where no control is displayed) in the video playing page when the second video is in a playing state, an operation that triggers an information display control (for a case where the information display control that instructs the electronic device to display the shooting prompt information is provided in the video playing page) in the second video, or the like. An example is given below in which the fifth trigger operation is an operation to click a non-control region of the video playing page when the second video is in a playing state, and at this time, the fifth trigger operation may further instruct the electronic device to suspend playing of the second video. Correspondingly, the shooting prompt information may be information prompting a user to shoot with the shooting background of the currently viewed video as the video background, which may be displayed when the currently played video has a background picture and a fifth trigger operation is received.

Illustratively, the electronic device plays a second video in the video playing page.

Figure 2:
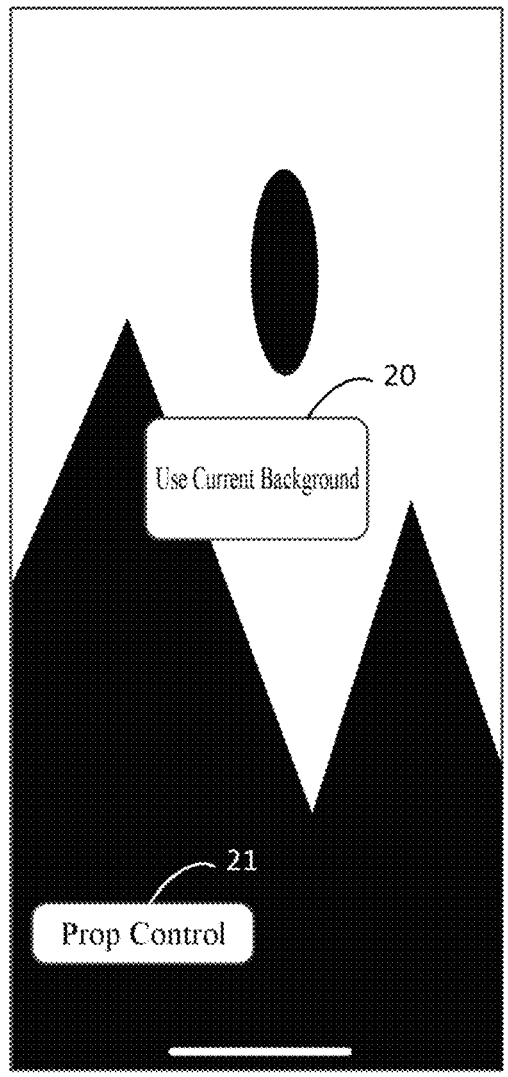
FIG. 2 is a schematic diagram of a video playing page provided by an embodiment of the present disclosure.

When the user desires to view the prompt information or when the user desires to pause the playing of the second video, he/she clicks a video playing region in the video playing page. When the electronic device detects a click operation applied to the video playing region, it is determined that a fifth trigger operation is received, and in response to the fifth trigger operation, the playing of the second video is paused, and the shooting prompt information 20 is displayed, as shown in FIG. 2. Therefore, when the user desires to shoot a video using the background picture in the second video as the shooting background, the shooting prompt information 20 can be triggered (e.g., clicked). Accordingly, when the electronic device detects that the user triggers the shooting prompt information 20, the electronic device may use the content contained in the background picture of the second video as the target content, and determine that the first trigger operation is received.

In another embodiment, the first triggering operation further comprises a trigger operation for a second shooting control, and the method further comprises, after the playing, in the target page, a second video: receiving a sixth trigger operation for a prop control displayed in the target page; and in response to the sixth trigger operation, displaying a prop detail page of a target shooting prop adopted by the second video, and displaying the second shooting control in the prop detail page.

In the above embodiment, the user may also use the target picture in the second video for shooting a video by triggering the second shooting control in the prop detail page of the target shooting prop adopted by the second video.

The prop control can be a control for the user to trigger to view the shooting prop adopted by the currently played video (such as a second video), which can be displayed when the currently played video uses the shooting prop during shooting. Accordingly, the sixth trigger operation may be an operation of triggering (e.g., clicking) the prop control. The second shooting control may be a control for the user to trigger to shoot the same style of video by adopting the shooting prop (including the shooting background used by the shooting prop) corresponding to the prop detail page. The target shooting prop may be a shooting prop of a video that can adopt selected content as the background and adopt a certain type of shooting object (e.g., a person) as the foreground, such as a green screen prop. The following description will take the green screen prop as the target shooting prop as an example. It is understood that the green screen prop is only the name of the shooting prop and is not used to limit the color of the background thereof.

Figure 3:
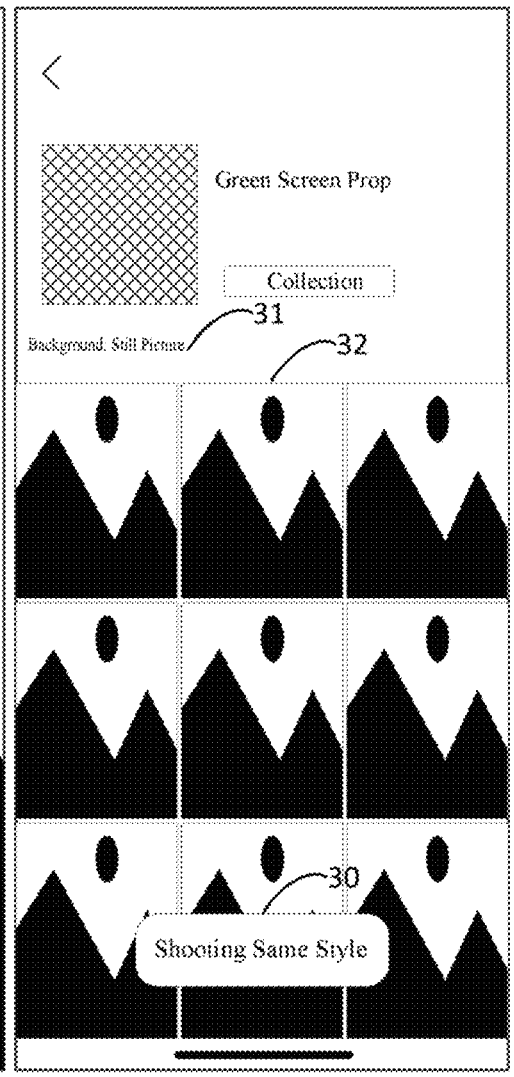
FIG. 3 is a schematic diagram of a prop detail page provided by an embodiment of the present disclosure.

Specifically, as shown in FIG. 2, the electronic device plays the second video in the video playing page (including a first video playing page for playing the videos shot by using different shooting props and/or a second video playing page for playing the videos shot by using the target shooting prop) and displays the prop control 21. When the user desires to check the prop details of the target shooting prop used by the second video, the prop control 21 is triggered. Upon detecting that a user triggers the prop control 21 in the video playing page, the electronic device switches the currently displayed page from the video playing page to the prop detail page of the target shooting prop used by a video (such as a second video) played in the video playing page, and displays a second shooting control 30 in the prop detail page, as shown in FIG. 3. Therefore, when the user desires to adopt the shooting prop and/or the video background (such as the target picture) used by the video to shoot a video, the second shooting control 30 in the prop detail page is triggered. Accordingly, the electronic device may determine that a first trigger operation for content (i.e., the target content) displayed in the background picture of the video is received upon detecting that the user triggers the second shooting control 30.

Figures 4, 5:
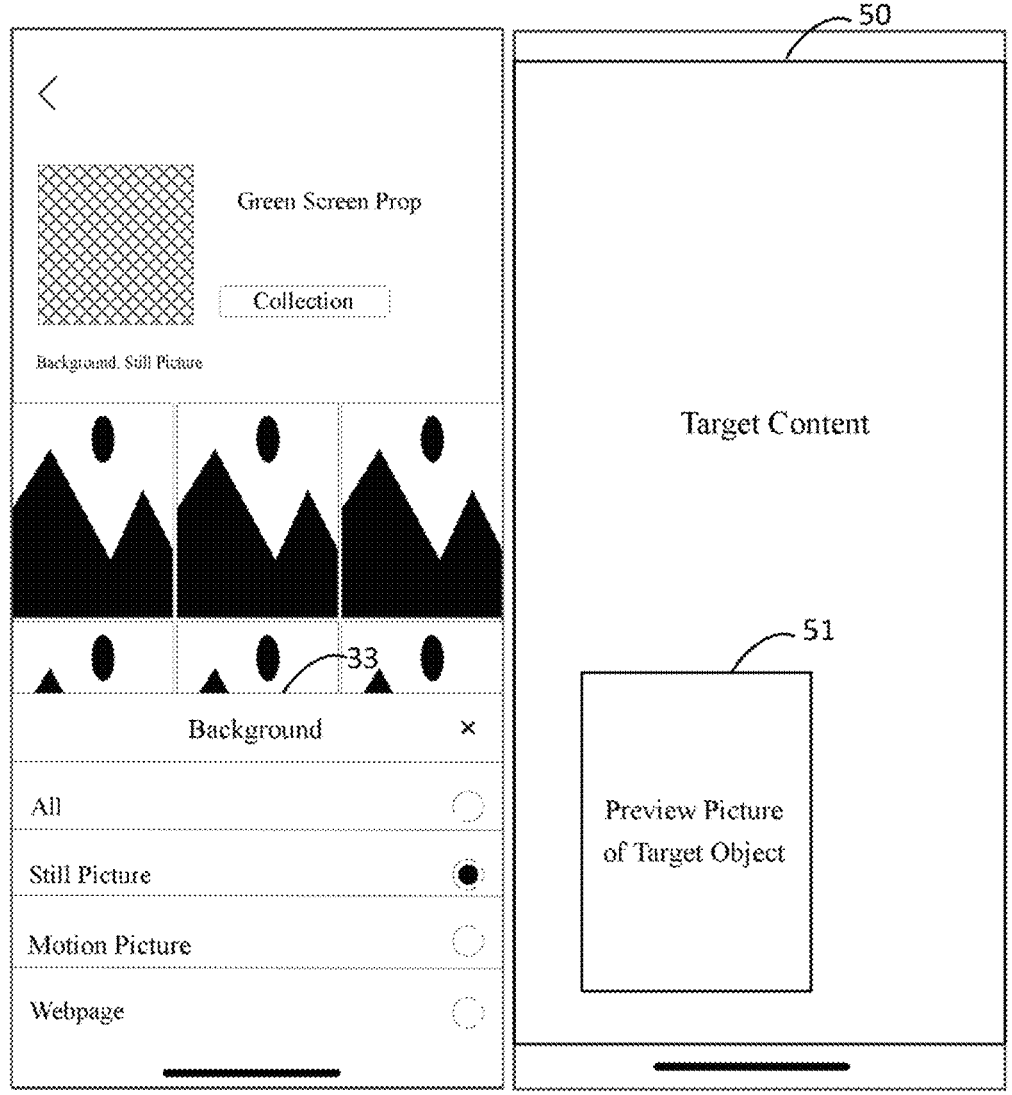
FIG. 4 is a schematic diagram of a type selection window provided by an embodiment of the present disclosure.
FIG. 5 is a schematic diagram of a shooting page provided by an embodiment of the present disclosure.

In addition, as shown in FIG. 3, a type control 31 and video information 32 of various recommended videos shot by adopting the background picture consistent with a picture type (such as a still picture, a motion picture, a webpage, all, or the like) corresponding to the currently displayed type control may be further displayed in the prop detail page of the target shooting prop. The user may instruct the electronic device to display a type selection window 33 by triggering the type control 31, as shown in FIG. 4, and instruct the electronic device to display video information on recommended videos shot by using a corresponding type of background picture in the prop detail page by triggering a certain type option (such as all, still picture, motion picture, or webpage) in the type window 33.

In yet another embodiment, the first trigger operation further comprises a trigger operation for a third shooting control, and the method further comprises, prior to the playing, in the target page, a second video: displaying a prop detail page of the target shooting prop adopted by a third video, wherein video information on at least one recommended video shot by the target shooting prop is displayed in the prop detail page, the recommended video comprising the second video; and wherein the playing, in the target page, a second video comprises: upon receiving a seventh trigger operation for video information on the second video, switching a current display page from the prop detail page to the target page, and playing the second video and displaying the third shooting control in the target page.

In this embodiment, the second video may be a recommended video corresponding to certain video information displayed in the prop detail page of the target shooting prop, and the user may watch the recommended video shot with a certain type of shooting background adopted in the second video playing page, and may shoot a video with the same video background as the recommended video by triggering a third shooting control of a certain recommended video (for example, the second video) played in the second video playing page.

The third video may be a video played in the video playing page (including a first video playing page for playing videos shot by using different shooting props and/or a second video playing page for playing videos shot by using the target shooting prop) displayed before switching to the prop detail page of the target shooting prop, and the video may be a video shot by using the target shooting prop, and a video background thereof may be the same as or different from that of the second video. The recommended video may be a video recommended to the user and shot by using the target shooting prop. The video information on the recommended video may be related information on the recommended video, such as a video name and/or a video cover, or the like. The seventh trigger operation may be an operation of triggering certain video information (e.g., video information on the second video) displayed in the prop detail page.

Illustratively, the electronic device plays a third video shot by using the target shooting prop in the first video playing page/the second video playing page. When the user desires to view the prop details of the target shooting prop or use other videos shot by the target shooting prop, the prop control in the first video playing page/the second video playing page is triggered. Upon detecting that the user triggers the prop control, the electronic device switches the current display page from the video playing page to the prop detail page of the target shooting prop, and displays video information on at least one recommended video shot by adopting the target shooting prop in the prop detail page. The user can instruct the electronic device to display video information on recommended videos acquired by shooting with use of a corresponding type of background picture in the prop detail page by triggering the type control in the prop detail page, and can trigger (e.g., click) the video information on a certain recommended video when the user desires to watch this recommended video. Upon detecting that a user triggers the video information on a certain recommended video displayed in the prop detail page, the electronic device switches the current display page from the prop detail page of the target shooting video to a second video playing page, plays the recommended video in the second video playing page and displays the third shooting control. Therefore, when the user desires to shoot a video by using the background picture in the recommended video, he/she may trigger the third shooting control. Correspondingly, upon detecting that the user triggers the third shooting control displayed in the second video playing page, the electronic device may determine the content contained in the background picture as the target content, and determine that the first trigger operation for the target content is received.

It should be noted that, after switching to the second video playing page, the user may also switch the video played in the second video playing page through a video switching operation such as sliding up and down, and may shoot a video by using a background picture in the switched video. For example, when a user desires to shoot a video using a background picture in a video (e.g., a video switched by performing the video switching operation) played in a second video playing page at the current time, he/she may trigger a third shooting control displayed in the second video playing page; therefore, upon detecting that the user triggers the third shooting control, the electronic device may determine, as the target content, the content contained in the background picture in the video played in the second video playing page at the current moment, and determine that the first trigger operation for the target content is received.

S102, in response to the first trigger operation, acquiring a target picture containing the target content, starting a camera, and displaying a shooting page, wherein a preview picture of a target object acquired by the camera is displayed in the shooting page with the target picture as a background.

The target picture may be a picture including target content displayed in the target page. The target object may be a preset type of shooting object, and the preset type may be an article, a person, or the like. The target object is taken as a person as an example below. At this time, a preview picture of the target object may be acquired in a manner of person recognition. For example, a picture acquired by a camera is acquired and person recognition is performed on the picture, and the recognized person picture is taken as a preview picture of the target object, that is, the picture acquired by the camera is subjected to person cutout, so as to acquire a preview picture of the target object.

Illustratively, upon receiving the first trigger operation, the electronic device may acquire a target picture containing target content, for example, acquiring an existing picture containing the target content as the target picture, or generating a picture containing the target content, start the camera, display the shooting page, present the target picture 50 in a picture background manner in the shooting page, and display the preview picture 51 of the target object included in the picture acquired by the camera on an upper layer of the target picture, as shown in FIG. 5.

In this embodiment, when the target picture is displayed in the shooting page, the size of the target page may be adjusted according to the size of the shooting page. For example, the height and the width of the target picture are scaled proportionally, so as to adjust the height value/width value of the target picture to be the same as the length value/width value of the shooting page, and to adjust the width value/height value of the target picture to be greater than or equal to the width value/height value of the shooting page. At this time, after the target picture being displayed, if the target picture is not completely displayed in the shooting page, that is, if the height value/width value of the target picture is greater than the height value/width value of the shooting page, the target picture can be controlled to move in the shooting page by a preset distance in the vertical direction/horizontal direction or move to the lower boundary/right boundary of the target picture so as to move into the shooting page, and can further move back to the initial display position again, so as to prompt a user that the target picture is not completely displayed, and the display content of the target picture in the shooting page can be adjusted according to requirements.

In this embodiment, after displaying the foreground (i.e., the preview picture of the target object) and the background (i.e., the target picture) in the shooting page, the user may further adjust the foreground and the background as needed, for example, adjusting the size of the foreground through a three-finger zoom operation, adjusting the position of the foreground through dragging, and/or adjusting the content of the background displayed in the shooting page through a sliding operation (i.e., adjusting the content of the target picture displayed in the shooting page). Accordingly, upon detecting a corresponding adjustment operation of the user, the electronic device may perform the adjustment operation on the size and the display position of the foreground, or the content of the background displayed in the shooting page.

S103, receiving a video shooting operation acting in the shooting page.

The video shooting operation may be an operation of instructing the electronic device to shoot a video, such as an operation of triggering a shooting control in a shooting page or the like.

Specifically, the electronic device displays the target picture in a background manner on the shooting page, and displays the preview picture of the target object acquired by the camera on an upper layer of the target picture. Therefore, when the user desires to shoot a video by taking the target picture background as the video background, he/she may trigger (e.g., click) the shooting control in the shooting page. Accordingly, upon detecting that the user triggers the shooting control in the shooting page, the electronic device can determine that the video shooting operation acting in the shooting page is received.

S104, in response to the video shooting operation, shooting a first video of the target object with the target picture as a video background.

The first video may be understood as a video which is shot in response to a video shooting operation of a user and takes the target picture as the video background. When the target object is a person, the first video may be a video in which the target object gives own insights to the target content.

In this embodiment, after receiving a video shooting operation, the electronic device may take a video (i.e., the first video) with the target picture as the video background. For example, the picture of the target object acquired by the camera in real time may be taken as a foreground, and the target picture may be taken as a background, and picture composition may be performed according to a display position of the picture of the target object in a shooting page and display content of the target picture in the shooting page, to acquire the first video containing the picture of the target object and the display content of the target picture.

In this embodiment, in the process of shooting the first video, the user may further adjust the foreground and the background as needed; for example, the size of the foreground may be adjusted by zooming, the position of the foreground may be adjusted by dragging, and/or the content of the background displayed in the shooting page may be adjusted by a sliding operation (e.g., a sliding operation in a vertical direction or a sliding operation in a horizontal direction). Correspondingly, upon detecting the corresponding adjustment operation of the user, the electronic device may perform the adjustment operation on the size and the display position of the foreground or the content of the background displayed in the shooting page according to the adjustment operation, and synthesize a subsequent video frame of the first video according to the adjusted foreground and/or background to acquire the first video.

The video shooting method provided by the embodiment comprises receiving a first trigger operation for target content displayed in a target page, the target page comprising a webpage material display page and/or a video playing page; in response to the first trigger operation, acquiring a target picture containing the target content, starting a camera, and displaying a shooting page, wherein a preview picture of a target object acquired by the camera is displayed in the shooting page with the target picture as a background; receiving a video shooting operation acting in the shooting page; and in response to the video shooting operation, shooting a first video of the target object with the target picture as a video background. By adopting the above technical solution in the embodiment, video can be shot by utilizing the target content browsed by the user, and the user experience is improved.

Figure 6:
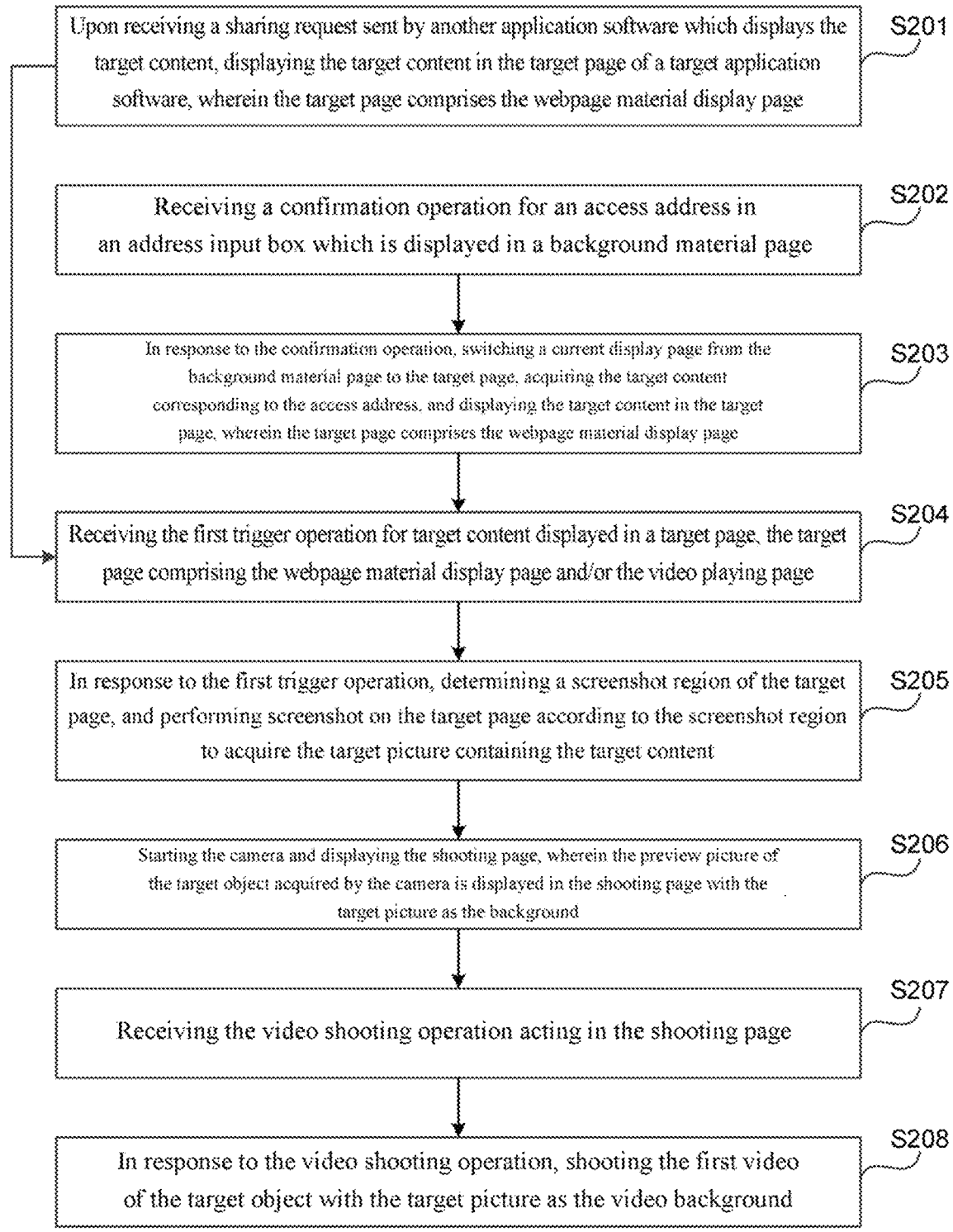
FIG. 6 is a schematic flowchart of another video shooting method provided by an embodiment of the present disclosure.

FIG. 6 is a schematic flowchart of another video shooting method according to an embodiment of the present disclosure. The solution in this embodiment may be combined with one or more of the alternatives in the embodiments described above. Optionally, the target page includes the webpage material display page, and before the receiving the first trigger operation for the target content displayed in the target page, the method further comprises: upon receiving a sharing request sent by another application software which displays the target content, displaying the target content in the target page of a target application software.

Optionally, the target page includes the webpage material display page, and before the receiving the first trigger operation for the target content displayed in the target page, the method further comprises: receiving a confirmation operation for an access address in an address input box, wherein the address input box is displayed in a background material page; and in response to the confirmation operation, switching the current display page from the background material page to the target page, acquiring the target content corresponding to the access address, and displaying the target content in the target page.

Optionally, acquiring a target picture containing the target content comprises: determining a screenshot region of the target page, and performing screenshot on the target page according to the screenshot region to acquire the target picture containing the target content.

Correspondingly, as shown in FIG. 6, the video shooting method provided by the present embodiment may comprise:

S201, upon receiving a sharing request sent by another application software which displays the target content, displaying the target content in the target page of a target application software, and performing step S204, wherein the target page comprises the webpage material display page.

In this embodiment, the target content may be webpage content, such as image-text content of news or articles presented in a certain webpage. The user can browse the webpage content in the page which does not belong to the target application software, and the webpage content is displayed in the target application software in a sharing manner, so that the target shooting prop in the target application software is adopted to shoot the video taking the webpage content as the background.

The target page can be a webpage material display page of the target shooting prop.

Figures 7, 8:
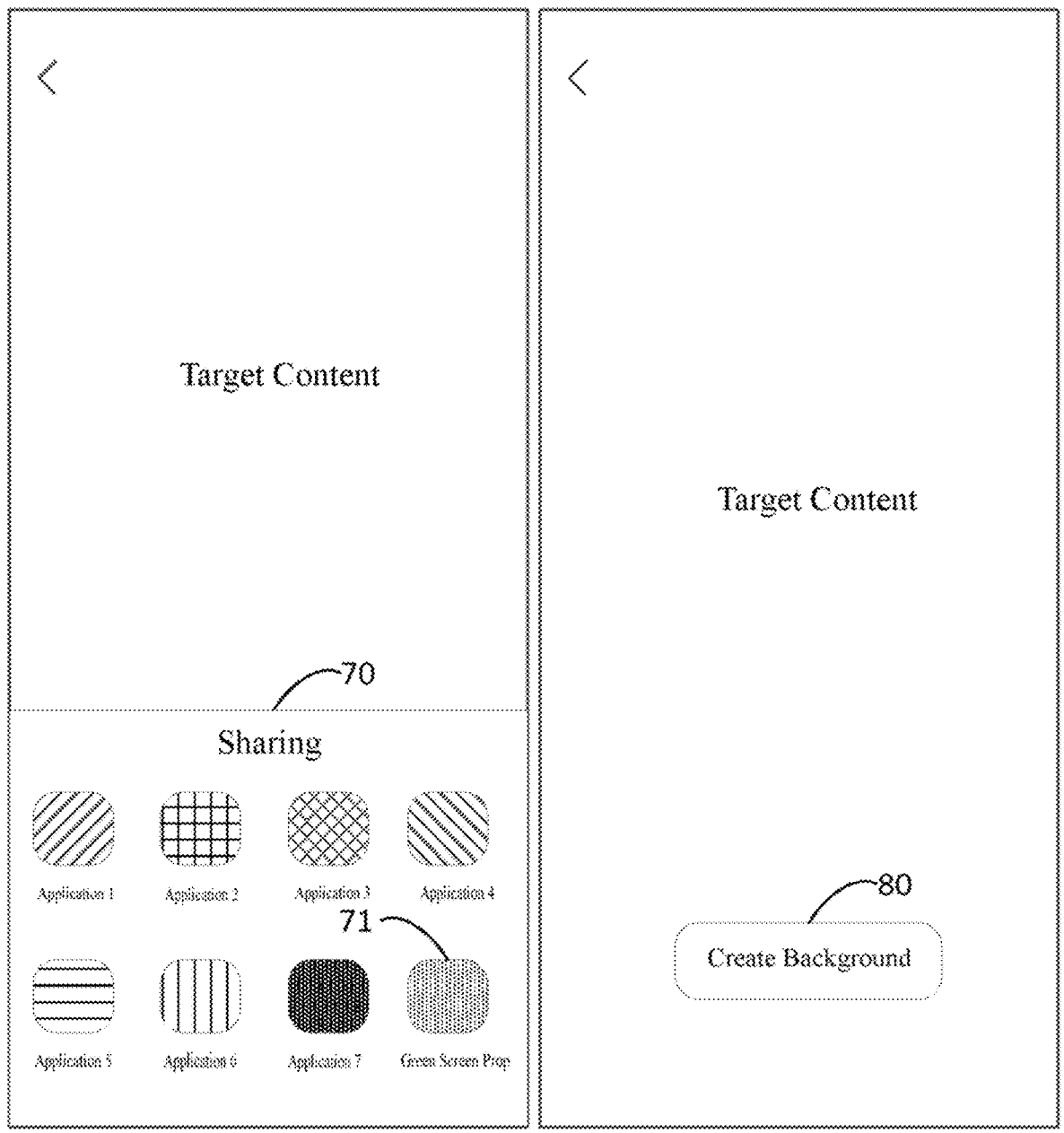
FIG. 7 is a schematic diagram of a display page of target content provided by an embodiment of the present disclosure.
FIG. 8 is a schematic diagram of a webpage material display page provided by an embodiment of the present disclosure.

Illustratively, the electronic device displays a corresponding display page of the another application software and displays the target content in the display page. A user browses target content on the display page, and when the target content is intended to be used as a background to shoot a video, the user may instruct the electronic device to display a sharing window 70 by triggering a sharing control for the target content, which is displayed on the display page, as shown in FIG. 7, and further trigger sharing to target shooting prop control 71 in the sharing window 70. Correspondingly, when detecting that the user triggers the share-to-target shooting prop control 71, the another application software may generate a share request for the target content, and send the share request to the target application software. Therefore, upon receiving a sharing request sent by the another application software, the present application software may acquire the target content according to the identification information (such as the content ID or the access address for the target content) of the target content carried in the sharing request, display the webpage material display page of the target shooting prop, and display the target content in the webpage material display page, as shown in FIG. 8.

It can be understood that the user may also browse the target content in the target application software, and at this time, when the target application software receives the sharing operation for the target content, the target application software may directly display the webpage material display page of the target shooting prop, and display the target content in the webpage material display page. If a sharing-to-target shooting prop control is not set in the application sharing window of the another application software which displays the target content, the user can instruct the another application software to further display the system sharing window of the electronic device by performing corresponding trigger operation, and trigger the sharing-to-target shooting prop control in the system sharing window.

S202, receiving a confirmation operation for an access address in an address input box which is displayed in a background material page.

S203, in response to the confirmation operation, switching a current display page from the background material page to the target page, acquiring the target content corresponding to the access address, and displaying the target content in the target page, wherein the target page comprises the webpage material display page.

In this embodiment, the user may also display the webpage content in the target application software by inputting an access address for the target content in a background material page of the target shooting prop, so as to shoot a video with the webpage content as a background by using the target shooting prop.

Specifically, as shown in FIG. 9, the electronic device displays a background material page of the target shooting prop, and displays an address input box 90 in the background material page. Thus, the user can enter the access address of the content (i.e., the target content) that he/she desires to shoot as the background in the address entry box 90 and click the confirmation control 91 in the background material page after the entry is completed. Upon detecting that the user triggers the confirmation control 91, the electronic device may determine that a confirmation operation for an access address in the address input box is received, and in response to the confirmation operation, switch the current display page from the background material page to the webpage material display page of the target shooting prop, acquire content corresponding to the access address in the address input box as target content, and display the target content in the webpage material display page, as shown in FIG. 8.

In addition, if the target content is not successfully acquired or not acquired due to the reasons that the storage server of the target content is abnormal or unsafe factors of the access address are detected, abnormal prompt information can be displayed in the webpage material display page to prompt the user.

In one embodiment, before receiving a confirmation operation for an access address in an address input box, the method further comprises: upon receiving a second trigger operation for a first address control of a target shooting prop, displaying the background material page, and displaying the address input box in the background material page so as to enable a user to input the access address for the target content, wherein the target shooting prop is used for shooting a video with use of a preset background which comprises the target content.

The first address input control is operable to indicate an electronic device to display address input box. The second trigger operation may be an operation that triggers (e.g., clicks on) the first address input control.

In this embodiment, the user may instruct the electronic device to display the address input box by triggering the first address control of the target shooting prop.

Specifically, the electronic device may display a prop window 100, and after the user selects a target shooting prop 101 in the prop window 100, the electronic device displays a prop tray 102 of the target shooting prop, displays a first address control 103 in the prop tray 102, and further displays recommended pictures 104 that can be directly used as a background by the user in the prop tray 102, as shown in FIG. 10. Therefore, when the user desires to input the access address for the target content to be used as the background, the user can trigger the first address control 103. Correspondingly, upon detecting that the user triggers the first address control, the electronic device may display a background material page of the target shooting prop, and display an address input box 90 in the background material page, as shown in FIG. 9.

In another embodiment, before receiving a confirmation operation for an access address in an address input box, the method further comprises: upon receiving a third trigger operation for a material control of a target shooting prop, displaying the background material page, and displaying respective candidate background materials and a second address control in the background material page; and in response to a fourth trigger operation for the second address control, displaying the address input box in the background material page so as to enable a user to input the access address for the target content.

The material control can be used for instructing the electronic device to display a background material page. The second address control can be used to instruct the electronic device to display an address input box in the background material page. Accordingly, the third trigger operation may be an operation that triggers (e.g., clicks) the material control. The fourth trigger operation may be an operation that triggers (e.g., clicks) the second address control.

In this embodiment, the user may instruct the electronic device to display the address input box by triggering a webpage control in the background material page of the target shooting prop.

Figure 11:
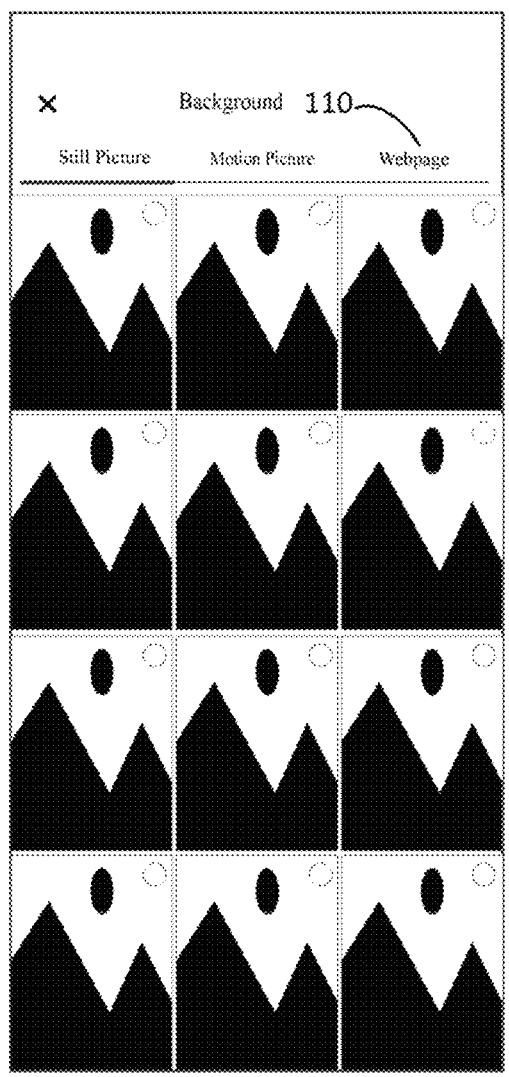
FIG. 11 is a schematic diagram of another background material page provided by an embodiment of the present disclosure.

Specifically, as shown in FIG. 10, the electronic device displays a material control 105 in a prop tray of the target shooting prop. When a user desires to set a background used when the user takes a video with the target shooting prop, the material control 105 may be triggered. Upon detecting that the user triggers the material control 105, the electronic device may display a background material page of the target shooting prop, and display a preset type (such as a still picture, a motion picture, or the like) of candidate background materials in the background material page, as shown in FIG. 11 (the example of displaying the candidate background materials of the still picture type is described in the figure). Therefore, when the user desires to input the access address for the target content to be used as the background, the user can trigger the second address control 110 in the background material page. Accordingly, the electronic device can display the address entry box 90 in the background material page upon detecting that the user triggers the second address control 110, as shown in FIG. 9.

S204, receiving the first trigger operation for target content displayed in a target page, the target page comprising the webpage material display page and/or the video playing page.

S205, in response to the first trigger operation, determining a screenshot region of the target page, and performing screenshot on the target page according to the screenshot region to acquire the target picture containing the target content.

In this embodiment, when the target content is webpage content, a target picture containing the target content shown in the target page may be acquired in a screenshot manner, so that a video is taken by using the target picture as a background.

Taking the target page as the webpage material display page as an example. As shown in FIG. 8, the electronic device may display the target content in the webpage material display page of the target shooting prop. When the user desires to create a background picture containing the target content, the user may trigger the create background control 80 in the display page of the webpage material. Correspondingly, upon detecting that the user triggers the creation background control 80, the electronic device may determine that a first trigger operation for the target content is received, determine, in response to the first trigger operation, a screenshot region in the webpage material display page according to a preset determination rule, perform screenshot on the webpage material display page according to the screenshot region, and take the captured picture as the target picture.

The preset determination rule for the screenshot region may be set according to requirements. For example, the electronic device may automatically determine the screenshot region. For example, the electronic device may automatically identify a display region of the target content in the webpage material display page, and determine the display region as the screenshot region; the electronic device may display a page screen frame on a webpage material, and the user may adjust the size and the position of the screen frame as needed and may trigger a confirmation control after the adjustment is completed, so that when the electronic device detects that the user triggers the confirmation control, the screen frame may be used as a boundary to determine the screenshot region.

S206, starting the camera and displaying the shooting page, wherein the preview picture of the target object acquired by the camera is displayed in the shooting page with the target picture as the background.

S207, receiving the video shooting operation acting in the shooting page.

S208, in response to the video shooting operation, shooting the first video of the target object with the target picture as the video background.

The video shooting method provided by the embodiment automatically captures the target picture containing the target content in the webpage browsed by the user or the target content corresponding to the access address input by the user, and shoots the video containing the target picture, so that the user does not need to manually capture and store the picture, and does not need to manually switch to the target page after storing the picture and set the picture as the video background of the video to be shot, such that the operation required when the video with the specific background is shot can be further simplified, and the shooting experience of the user is improved.

Figure 12:
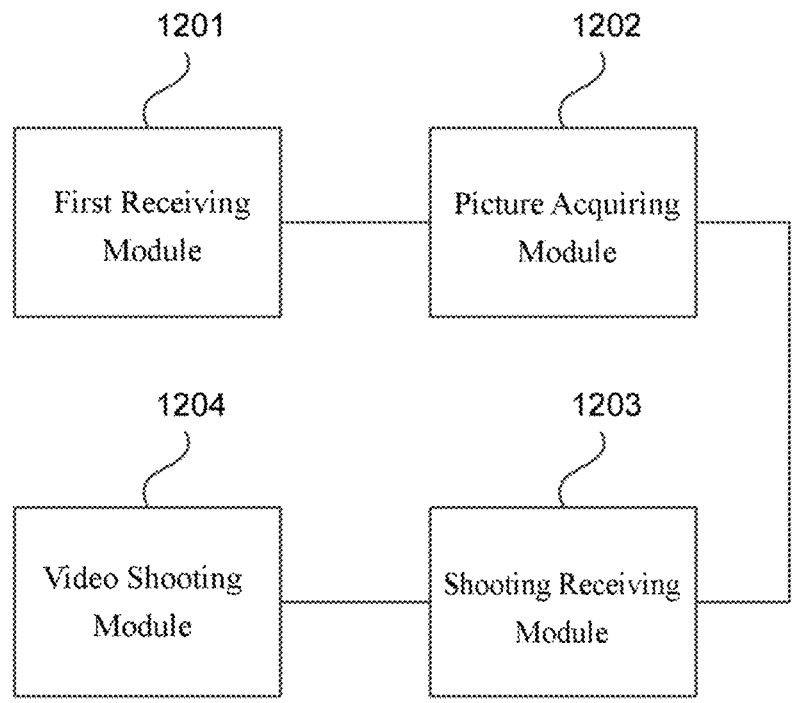
FIG. 12 is a block diagram of a video shooting apparatus provided by an embodiment of the present disclosure.

FIG. 12 is a block diagram of a video shooting apparatus provided by an embodiment of the present disclosure. The apparatus can be implemented by software and/or hardware, can be configured in an electronic device, can be typically configured in a mobile phone or a tablet computer, and can shoot a video with a set background by performing a video shooting method. As shown in FIG. 12, the video camera provided in the present embodiment may include: a first receiving module 1201, a picture acquiring module 1202, a shooting receiving module 1203, and a video shooting module 1204.

The first receiving module 1201 is configured to receive a first trigger operation for target content displayed in a target page, the target page comprising a webpage material display page and/or a video playing page.

The picture acquiring module 1202 is configured to acquire, in response to the first trigger operation, a target picture containing the target content, start a camera and display a shooting page, wherein a preview picture of a target object acquired by the camera is displayed in the shooting page with the target picture as a background.

The shooting receiving module 1203 is configured to receive a video shooting operation acting in the shooting page;

The video shooting module 1204 is configured to shoot, in response to the video shooting operation, a first video of the target object with the target picture as a video background.

The video shooting apparatus provided by the embodiment is configured to: receive a first trigger operation acting on a target page which displays the target content through a first receiving module, wherein the target page comprises a webpage material display page and/or a video playing page; in response to the first trigger operation, acquire, by a picture acquisition module, the target picture containing the target content, start a camera, switch a current display page from the target page to a shooting page, and display a preview picture of a target object acquired by the camera in the shooting page with the target picture as a background; receive a video shooting operation acting in a shooting page through a shooting receiving module; and in response to the video shooting operation through the video shooting module, shoot a first video of the target object with the target picture as a video background. By adopting said technical solution, the video can be shot by utilizing the target content browsed by the user, and the user experience is improved.

In the foregoing solution, the target page may include a webpage material display page. The video shooting apparatus provided in this embodiment may further comprise: a first display module configured to display, upon receiving a sharing request sent by other application software displaying the target content, the target content in a target page of the application software.

In the foregoing solution, the target page may include a webpage material display page. The video shooting apparatus provided in this embodiment may further comprise: a confirmation receiving module, configured to receive a confirmation operation for an access address in an address input box before the receiving of the first trigger operation for the target content displayed in the target page, where the address input box is displayed in a background material page; and a second display module configured to switch, in response the confirmation operation, the current display page from the background material page to the target page, acquire the target content corresponding to the access address, and display the target content in the target page.

Further, the video shooting apparatus provided in this embodiment may further comprise: an address input module configured to display a background material page and display an address input box in the background material page before the confirmation operation for the access address in the address input box is received, and when a second trigger operation of a first address control for a target shooting prop is received, display the background material page and display an address input box in the background material page so that a user can input the access address for the target content, wherein the target shooting prop is used for shooting a video by adopting a preset background, and the preset background comprises the target content; or when a third trigger operation of a material control for the target shooting prop is received, display a background material page, and display respective candidate background materials and a second address control in the background material page; and in response to a fourth trigger operation for the second address control, display an address input box in the background material page so as to enable a user to input an access address for the target content.

In the foregoing solution, the picture acquiring module 1202 may be configured to: determine a screenshot region of the target page, and perform screenshot on the target page according to the screenshot region to acquire the target picture containing the target content.

In the foregoing solution, the target page may include a video playing page, the first trigger operation may include a trigger operation of shooting prompt information on the target picture, and the video shooting apparatus provided in this embodiment may further include: a video playing module configured to play a second video in the target page, wherein the second video takes the target picture as a video background; a second receiving module configured to receive a fifth trigger operation for the second video; and a prompting module configured to display, in response to the fifth trigger operation, shooting prompt information so as to prompt a user to adopt the target picture to shoot a video.

In the foregoing solution, the first trigger operation may further include a triggering operation for a second shooting control, and the video shooting apparatus provided in this embodiment may further comprise: a third receiving module, configured to receive a sixth trigger operation for a prop control displayed in the target page after the second video is played in the target page; and a first detail display module configured to display, in response to the sixth trigger operation, a prop detail page of a target shooting prop, and display the second shooting control in the prop detail page, wherein the target shooting prop is a shooting prop adopted by the second video.

In the foregoing solution, the first trigger operation may further include a trigger operation for a third shooting control, and the video shooting apparatus provided in this embodiment may further comprise: a second detail display module, configured to display a prop detail page of a target shooting prop adopted by a third video before a second video is played in the target page, where video information on at least one recommended video shot by using the target shooting prop is displayed in the prop detail page, and the recommended video includes the second video; the video playing module may be configured to: when a seventh trigger operation for the video information on the second video is received, switch the current display page from the prop detail page to the target page, wherein the second video is played and the third shooting control is displayed in the target page. The video shooting apparatus provided by the embodiment of the present disclosure can perform the video shooting method provided by any embodiment of the disclosure, and has corresponding functional modules and beneficial effects for performing the video shooting method. For details of the technology that are not described in detail in this embodiment, references may be made to a video shooting method provided in any embodiment of the present disclosure.

Figure 13:
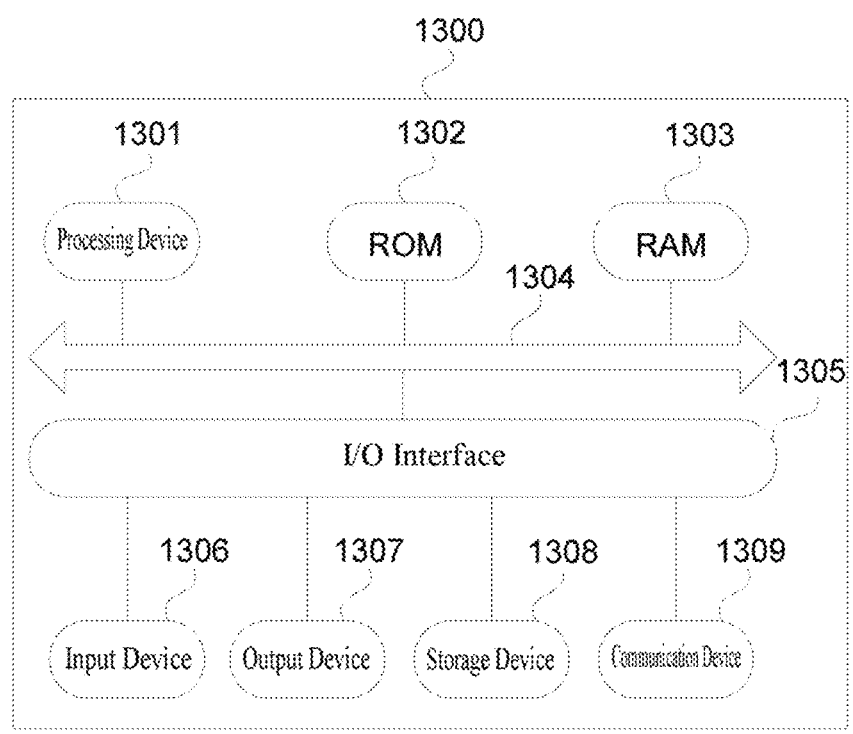
FIG. 13 is a schematic structural diagram of an electronic device provided by an embodiment of the present disclosure.

Referring now to FIG. 13, shown is a schematic structural diagram of an electronic device (e.g., terminal device) 1300 suitable for use in implementing embodiments of the present disclosure. The terminal device in the embodiments of the present disclosure may include, but being not limited to, a mobile terminal such as a mobile phone, a notebook computer, a digital broadcast receiver, a PDA (personal digital assistant), a PAD (tablet computer), a PMP (portable multimedia player), a vehicle terminal (e.g., a car navigation terminal), and the like, and a fixed terminal such as a digital TV, a desktop computer, and the like. The electronic device shown in FIG. 13 is only an example, and should not bring any limitation to the functions and the scope of use of the embodiments of the present disclosure. As shown in FIG. 13, the electronic device 1300 may include a processing device (e.g., a central processor, a graphics processor, etc.) 1301 that may perform various appropriate actions and processes according to a program stored in a Read Only Memory (ROM) 1302 or a program loaded from a storage device 1306 into a Random Access Memory (RAM) 1303. In the RAM 1303, various programs and data necessary for the operation of the electronic device 1300 are also stored. The processing device 1301, the ROM 1302, and the RAM 1303 are connected to each other via a bus 1304. An input/output (I/O) interface 1305 is also connected to the bus 1304.

Generally, the following devices may be connected to the I/O interface 1305: an input device 1306 including, for example, a touch screen, a touch pad, a keyboard, a mouse, a camera, a microphone, an accelerometer, a gyroscope, and so forth; an output device 1307 including, for example, a Liquid Crystal Display (LCD), a speaker, a vibrator, etc.; a storage device 1306 including, for example, a magnetic tape, a hard disk, and the like; and a communication device 1309. The communication device 1309 may allow the electronic device 1300 to communicate wirelessly or by wire with other devices to exchange data. While FIG. 13 illustrates an electronic device 1300 having various device, it is to be understood that not all illustrated devices are required to be implemented or provided. More or fewer devices may be alternatively implemented or provided.

In particular, the processes described above with reference to the flow diagrams may be implemented as computer software programs, according to embodiments of the present disclosure. For example, embodiments of the present disclosure include a computer program product comprising a computer program carried on a non-transitory computer readable medium, the computer program containing program codes for performing the method illustrated by the flow chart. In such an embodiment, the computer program may be downloaded and installed from a network through the communication device 1309, or installed from the storage device 1306, or installed from the ROM 1302. The computer program, when executed by the processing device 1301, performs the functions defined in the methods of the embodiments of the present disclosure.

It should be noted that the computer readable medium of the present disclosure may be a computer readable signal medium or a computer readable storage medium or any combination of the two. Examples of the computer readable storage medium include, but are not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain, or store a program for use by or in connection with an instruction execution system, apparatus, or device. In contrast, in the present disclosure, a computer readable signal medium may include a propagated data signal with computer readable program code embodied therein, for example, in baseband or as part of a carrier wave. Such a propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

In some embodiments, the clients and servers may communicate using any currently known or future developed network Protocol, such as HTTP (HyperText Transfer Protocol), and may be interconnected with any form or medium of digital data communication (e.g., a communication network). Examples of communication networks include a local area network ("LAN"), a wide area network ("WAN"), an Internet (e.g., the Internet), and peer-to-peer networks (e.g., ad hoc peer-to-peer networks), as well as any currently known or future developed network.

The computer readable medium may be embodied in the electronic device; or may be separate and not incorporated into the electronic device.

The computer readable medium carries one or more programs which, when executed by the electronic device, cause the electronic device to: receive a first trigger operation for target content displayed in a target page, wherein the target page comprises a webpage material display page and/or a video playing page; in response to the first trigger operation, acquire a target picture containing the target content, start a camera, and display a shooting page, wherein a preview picture of a target object acquired by the camera is displayed in the shooting page with the target picture as a background; receive a video shooting operation acting in the shooting page; in response to the video shooting operation, shoot a first video of the target object, wherein the first video takes the target picture as a video background.

Computer program codes for performing operations of the present disclosure may be written in one or more programming languages or a combination thereof, including but not limited to an object oriented programming language such as Java, Smalltalk, C++, and conventional procedural programming languages, such as the "C" programming language or similar programming languages. The program codes may be executed entirely on the user's computer, partly on the user's computer, as a stand-alone software package, partly on the user's computer and partly on a remote computer or entirely on the remote computer or server. In the case where a remote computer is involved, the remote computer may be connected to the user's computer through any type of network, including a Local Area Network (LAN) or a Wide Area Network (WAN), or the connection may be made to an external computer (for example, through the Internet using an Internet service provider).

The flowchart and block diagrams in the figures illustrate the architecture, functionality, and operation that may be implemented by systems, methods and computer program products according to various embodiments of the present disclosure. In this regard, each block in the flowchart or block diagrams may represent a module, a program segment, or a portion of a code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a reverse order, depending upon the functionality involved. It will also be noted that each block of the block diagrams and/or flowchart illustration, and combinations of blocks in the block diagrams and/or flowchart illustration, can be implemented by hardware-based systems dedicated to perform the specified functions or operations, or by combinations of dedicated hardware and computer instructions.

The units described in the embodiments of the present disclosure may be implemented by software or hardware. Wherein the names of the modules do not in some cases constitute a limitation of the unit itself.

The functions described hereinabove may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), system on a chip (SOCs), Complex Programmable Logic Devices (CPLDs), and the like.

In the context of this disclosure, a machine-readable medium may be a tangible medium that can contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

In accordance with one or more embodiments of the present disclosure, Example 1 provides a video shooting method, comprising:
  receiving a first trigger operation for target content displayed in a target page, the target page comprising a webpage material display page and/or a video playing page;
  in response to the first trigger operation, acquiring a target picture containing the target content, starting a camera, and displaying a shooting page, wherein a preview picture of a target object acquired by the camera is displayed in the shooting page with the target picture as a background;
  receiving a video shooting operation acting in the shooting page; and
  in response to the video shooting operation, shooting a first video of the target object with the target picture as a video background.

In accordance with one or more embodiments of the present disclosure, Example 2 provides the method of Example 1, the target page comprises the webpage material display page, and the method further comprises, prior to the receiving a first trigger operation for target content displayed in a target page:
  upon receiving a sharing request sent by another application software which displays the target content, displaying the target content in the target page of a target application software.

In accordance with one or more embodiments of the present disclosure, Example 3 provides the method of example 1, the target page comprises the webpage material display page, and the method further comprises, prior to the receiving a first trigger operation for target content displayed in a target page:
  receiving a confirmation operation for an access address in an address input box which is displayed in a background material page; and
  in response to the confirmation operation, switching a current display page from the background material page to the target page, acquiring the target content corresponding to the access address, and displaying the target content in the target page.

In accordance with one or more embodiments of the present disclosure, Example 4 provides the method of example 3, the method further comprises, prior to the receiving a confirmation operation for an access address in an address input box:

upon receiving a second trigger operation for a first address control of a target shooting prop, displaying the background material page, and displaying the address input box in the background material page so as to enable a user to input the access address for the target content, wherein the target shooting prop is used for shooting a video with use of a preset background which comprises the target content; or upon receiving a third trigger operation for a material control of a target shooting prop, displaying the background material page, and displaying respective candidate background materials and a second address control in the background material page; and in response to a fourth trigger operation for the second address control, displaying the address input box in the background material page so as to enable a user to input the access address for the target content.

In accordance with one or more embodiments of the present disclosure, Example 5 provides the method of any one of examples 2-4, the acquiring a target picture containing the target content comprises:

determining a screenshot region of the target page, and performing screenshot on the target page according to the screenshot region to acquire the target picture containing the target content.

In accordance with one or more embodiments of the present disclosure, Example 6 provides the method of example 1, the first trigger operation comprises a trigger operation for shooting prompt information on the target picture, and the method further comprises: playing, in the target page, a second video with the target picture as a video background;

receiving a fifth trigger operation for the second video; and in response to the fifth trigger operation, displaying the shooting prompt information to prompt a user to adopt the target picture to shoot a video.

In accordance with one or more embodiments of the present disclosure, Example 7 provides the method of example 6, the first trigger operation further comprises a trigger operation for a second shooting control, and the method further comprises, after the playing, in the target page, a second video:

receiving a sixth trigger operation for a prop control displayed in the target page; and in response to the sixth trigger operation, displaying a prop detail page of a target shooting prop adopted by the second video, and displaying the second shooting control in the prop detail page.

In accordance with one or more embodiments of the present disclosure, Example 8 provides the method of example 6, the first trigger operation further comprises a trigger operation for a third shooting control, and the method further comprises, prior to the playing, in the target page, a second video:

displaying a prop detail page of the target shooting prop adopted by a third video, wherein video information on at least one recommended video shot by the target shooting prop is displayed in the prop detail page, the recommended video comprising the second video; and wherein the playing, in the target page, a second video comprises:

upon receiving a seventh trigger operation for video information on the second video, switching a current display page from the prop detail page to the target page, and playing the second video and displaying the third shooting control in the target page.

In accordance with one or more embodiments of the present disclosure, Example 9 provides a video shooting apparatus, comprising:

a first receiving module configured to receive a first trigger operation for target content displayed in a target page, the target page comprising a webpage material display page and/or a video playing page;

a picture acquiring module configured to acquire, in response to the first trigger operation, a target picture containing the target content, start a camera and display a shooting page, wherein a preview picture of a target object acquired by the camera is displayed in the shooting page with the target picture as a background;

a shooting receiving module configured to receive a video shooting operation acting in the shooting page; and a video shooting module configured to shoot, in response to the video shooting operation, a first video of the target object with the target picture as a video background.

In accordance with one or more embodiments of the present disclosure, Example 10 provides an electronic device, comprising:

one or more processors; and a memory for storing one or more programs, wherein the one or more programs, when executed by the one or more processors, cause the one or more processors to perform the video shooting method according to any one of Examples 1-8.

In accordance with one or more embodiments of the present disclosure, Example 11 provides a non-transitory computer-readable storage medium, on which a computer program is stored, which, when being executed by a processor, performs the video shooting method according to any one of Examples 1 to 8.

The foregoing description is only exemplary of the preferred embodiments of the disclosure and is illustrative of the principles of the technology employed. It will be appreciated by those skilled in the art that the scope of the disclosure herein is not limited to technical solutions with particular combination of features described above, but also encompasses technical solutions formed by any combination of the features described above or equivalents thereof without departing from the spirit of the disclosure, such as technical solutions formed by replacement of the above features and the technical features disclosed in the present disclosure (but not limited to) having similar functions with each other.

Further, while operations are depicted in a particular order, this should not be understood as requiring that such operations be performed in the particular order shown or in sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or actions described above. Rather, the specific features and actions described above are only exemplary forms of implementing the claims.

What is claimed is:

1. A video capturing method, comprising:
acquiring a target picture of a target page displaying target content, wherein the target page comprises a webpage material display page;
displaying a capturing page including a preview picture of a target object and the target picture, the preview picture of the target object being a foreground of the capturing page, and the target picture being a background of the capturing page, wherein the preview picture of the target object is obtained by cutting out the target object from a picture acquired by a camera; and
capturing a first video of the target object and the target picture, the target picture being a background of the first video,
wherein the webpage material display page is determined according to an access address input in an address input box displayed in a preset page, and wherein in response to confirming the access address, switching the preset page to the webpage material display page displaying the target content corresponding to the access address; and
wherein the acquiring a target picture of a target page displaying target content comprises: in response to receiving a first trigger operation for a control presented on the target content displayed in the webpage material display page, acquiring a target picture of the webpage material display page displaying the target content as the target picture of the target page.

2. The method according to claim 1, further comprising:
in response to receiving a sharing request sent by another application software which presents the target content, displaying the target content in the target page of a target application software.

3. The method according to claim 1, further comprising:
in response to receiving a second trigger operation for a first address control of a target capturing prop, displaying the preset page, and displaying the address input box in the preset page so as to enable a user to input the access address for the target content, wherein the target capturing prop is used for capturing a video with use of a preset background which comprises the target content; or
in response to receiving a third trigger operation for a material control of a target capturing prop, displaying the preset page, and displaying respective candidate background materials and a second address control in the preset page; and in response to receiving a fourth trigger operation for the second address control, displaying the address input box in the preset page so as to enable a user to input the access address for the target content.

4. The method according to claim 2, wherein the acquiring a target picture of a target page displaying target content comprises:
determining a screenshot region of the target page, and performing screenshot on the target page according to the screenshot region to acquire the target picture of the target page displaying target content.

5. The method according to claim 1, wherein the acquiring a target picture of a target page displaying target content comprises:
determining a screenshot region of the target page, and performing screenshot on the target page according to the screenshot region to acquire the target picture of the target page displaying target content.

6. The method according to claim 1, wherein the target page further comprises a video playing page, and the method further comprises:
playing, in the video playing page, a second video, the target picture being a background of the second video; and
in response to receiving a fifth trigger operation for the second video, displaying capturing prompt information to prompt a user to adopt the target picture to capture a video,
and wherein the acquiring a target picture of a target page displaying target content comprises: in response to receiving a first trigger operation for the capturing prompt information, acquiring the background of the second video as the target picture.

7. The method according to claim 6, wherein the method further comprises, after the playing, in the video playing page, a second video:
in response to receiving a sixth trigger operation for a prop control displayed in the video playing page, displaying a prop detail page of a target capturing prop adopted by the second video, and displaying a second capturing control in the prop detail page,
and wherein the acquiring a target picture of a target page displaying target content comprises: in response to receiving a first trigger operation for the second capturing control, acquiring the background of the second video as the target picture.

8. The method according to claim 6, wherein the method further comprises, prior to the playing, in the video playing page, a second video:
displaying a prop detail page of a target capturing prop adopted by a third video, wherein video information on at least one recommended video captured by the target capturing prop is displayed in the prop detail page, the recommended video comprising the second video;
wherein the playing, in the video playing page, a second video comprises: in response to receiving a seventh trigger operation for the video information on the second video, switching the prop detail page to the video playing page, and playing the second video and displaying a third capturing control in the video playing page,
and wherein the acquiring a target picture of a target page displaying target content comprises: in response to receiving a first trigger operation for the third capturing control, acquiring the background of the second video as the target picture.

9. The method according to claim 1, wherein the preset page comprises a background material page.

10. A non-transitory computer-readable storage medium, on which a computer program is stored, which, when being executed by a processor, performs the following video capturing operations:
acquiring a target picture of a target page displaying target content, wherein the target page comprises a webpage material display page;

displaying a capturing page including a preview picture of a target object and the target picture, the preview picture of the target object being a foreground of the capturing page, and the target picture being a background of the capturing page, wherein the preview picture of the target object is obtained by cutting out the target object from a picture acquired by a camera; and capturing a first video of the target object and the target picture, the target picture being a background of the first video, wherein the webpage material display page is determined according to an access address input in an address input box displayed in a preset page, and wherein in response to confirming the access address, switching the preset page to the webpage material display page displaying the target content corresponding to the access address; and wherein the acquiring a target picture of a target page displaying target content comprises: in response to receiving a first trigger operation for a control presented on the target content displayed in the webpage material display page, acquiring a target picture of the webpage material display page displaying the target content as the target picture of the target page.

11. The storage medium according to claim 10, wherein the computer program, when being executed by the processor, further performs the following operation:

in response to receiving a sharing request sent by another application software which presents the target content, displaying the target content in the target page of a target application software.

12. The storage medium according to claim 10, wherein the computer program, when being executed by the processor, further performs the following operation:

in response to receiving a second trigger operation for a first address control of a target capturing prop, displaying the preset page, and displaying the address input box in the preset page so as to enable a user to input the access address for the target content, wherein the target capturing prop is used for capturing a video with use of a preset background which comprises the target content; or in response to receiving a third trigger operation for a material control of a target capturing prop, displaying the preset page, and displaying respective candidate background materials and a second address control in the preset page; and in response to receiving a fourth trigger operation for the second address control, displaying the address input box in the preset page so as to enable a user to input the access address for the target content.

13. The storage medium according to claim 11, wherein the acquiring a target picture of a target page displaying target content comprises:

determining a screenshot region of the target page, and performing screenshot on the target page according to the screenshot region to acquire the target picture of the target page displaying target content.

14. The storage medium according to claim 10, wherein the acquiring a target picture of a target page displaying target content comprises:

determining a screenshot region of the target page, and performing screenshot on the target page according to the screenshot region to acquire the target picture of the target page displaying target content.

15. The storage medium according to claim 10, wherein the target page further comprises a video playing page, and the computer program, when being executed by the processor, further performs the following operations:

playing, in the video playing page, a second video, the target picture being a background of the second video; and in response to receiving a fifth trigger operation for the second video, displaying capturing prompt information to prompt a user to adopt the target picture to capture a video, and wherein the acquiring a target picture of a target page displaying target content comprises: in response to receiving a first trigger operation for the capturing prompt information, acquiring the background of the second video as the target picture.

16. The storage medium according to claim 15, wherein after the playing, in the video playing page, a second video, the computer program, when being executed by the processor, further performs the following operation:

in response to receiving a sixth trigger operation for a prop control displayed in the video playing page, displaying a prop detail page of a target capturing prop adopted by the second video, and displaying a second capturing control in the prop detail page, and wherein the acquiring a target picture of a target page displaying target content comprises: in response to receiving a first trigger operation for the second capturing control, acquiring the background of the second video as the target picture.

17. The storage medium according to claim 15, wherein prior to the playing, in the video playing page, a second video, the computer program, when being executed by the processor, further performs the following operation:

displaying a prop detail page of a target capturing prop adopted by a third video, wherein video information on at least one recommended video captured by the target capturing prop is displayed in the prop detail page, the recommended video comprising the second video;

wherein the playing, in the video playing page, a second video comprises: in response to receiving a seventh trigger operation for the video information on the second video, switching the prop detail page to the video playing page, and playing the second video and displaying a third capturing control in the video playing page, and wherein the acquiring a target picture of a target page displaying target content comprises: in response to receiving a first trigger operation for the third capturing control, acquiring the background of the second video as the target picture.

18. An electronic device, comprising:

one or more processors; and a memory for storing one or more programs, wherein the one or more programs, when executed by the one or more processors, cause the one or more processors to perform the following video capturing operations:

acquiring a target picture of a target page displaying target content, wherein the target page comprises a webpage material display page;

displaying a capturing page including a preview picture of a target object and the target picture, the preview picture of the target object being a foreground of the capturing page, and the target picture being a background of the capturing page, wherein the preview picture of the target object is obtained by cutting out the target object from a picture acquired by a camera; and capturing a first video of the target object and the target picture, the target picture being a background of the first video, wherein the webpage material display page is determined according to an access address input in an address input box displayed in a preset page, and wherein in response to confirming the access address, switching the preset page to the webpage material display page displaying the target content corresponding to the access address; and wherein the acquiring a target picture of a target page displaying target content comprises: in response to receiving a first trigger operation for a control presented on the target content displayed in the webpage material display page, acquiring a target picture of the webpage material display page displaying the target content as the target picture of the target page.

\* \* \* \* \*